United States Patent [19]
Shipman et al.

[11] Patent Number: 5,671,413
[45] Date of Patent: Sep. 23, 1997

[54] METHOD AND APPARATUS FOR PROVIDING BASIC INPUT/OUTPUT SERVICES IN A COMPUTER

[75] Inventors: Mark S. Shipman, Hillsboro; Orville Christeson, Portland, both of Oreg.

[73] Assignee: Intel Corporation, Santa Clara, Calif.

[21] Appl. No.: 332,104

[22] Filed: Oct. 31, 1994

[51] Int. Cl.⁶ .................................................. G06F 9/00
[52] U.S. Cl. ............................................................ 395/652
[58] Field of Search ................................. 395/700, 650, 395/652, 651, 653, 712

[56] References Cited

U.S. PATENT DOCUMENTS

| | | | |
|---|---|---|---|
| 5,123,098 | 6/1992 | Gunning et al. | 395/400 |
| 5,291,585 | 3/1994 | Sato et al. | 395/500 |
| 5,303,326 | 4/1994 | Dean et al. | 395/2 |
| 5,379,431 | 1/1995 | Lemon et al. | 395/700 |
| 5,455,933 | 10/1995 | Schieve et al. | 395/183.03 |
| 5,459,867 | 10/1995 | Adams et al. | 395/700 |
| 5,463,766 | 10/1995 | Schieve et al. | 395/650 |
| 5,530,847 | 6/1996 | Schieve et al. | 395/183.14 |

*Primary Examiner*—Kevin A. Kriess
*Attorney, Agent, or Firm*—Blakely, Sokoloff, Taylor & Zafman

[57] ABSTRACT

The services to be provided by a basic input/output system (BIOS) of a computer system are implemented via a number of independently executable service components. Additionally, the BIOS is provided with a decompression dispatcher for decompressing and dispatching the service components into random access memory (RAM) of the computer system for execution on an as needed basis, and optionally removing the dispatched service components when they are no longer needed. As a result, the service components may be stored in a non-volatile storage in a compressed state, allowing more services to be implemented without requiring more non-volatile storage.

33 Claims, 11 Drawing Sheets

METHOD AND APPARATUS FOR PROVIDING BASIC INPUT/OUTPUT SERVICES IN A COMPUTER

BACKGROUND OF THE INVENTION

1. Field of the Invention

The present invention is related to personal computers and more particularly to an object-oriented basic input/output system using data compression.

2. Background Art

In IBM compatible personal computers a set of programs called basic input/output system (BIOS) are encoded in read-only memory (ROM). The BIOS facilitates the transfer of data and instructions between a central processing unit (CPU) and peripheral devices such as disk drives. Computer systems are designed to perform functional tests of the BIOS every time the computer is turned on. When the computer is turned on, BIOS is copied to an area of random access memory (RAM) set aside for it. Since a RAM is much faster acting than a ROM, accessing the BIOS code from RAM results in much faster initialization of the computer.

As more new features are designed into computers, more code has to be stored into the BIOS stored on the ROM. The size of the ROM must be increased to accommodate the additional code, resulting in additional manufacturing costs. It is desirable to decreases product cost by reducing the size of a ROM required to store the BIOS and all of its components. This can be done by decompressing the code as it is stored on the ROM and then decompressing the code at the time it is copied to the RAM.

SUMMARY OF THE INVENTION

The services to be provided by a basic input/output system (BIOS) of a computer system are implemented via a number of independently executable service components. Additionally, the BIOS is provided with a decompression dispatcher for decompressing and dispatching the service components into random access memory (RAM) of the computer system for execution on an as needed basis, and removing the dispatched service components when they are no longer needed. As a result, the service components may be stored in a non-volatile storage in a compressed state, allowing more services to be implemented without requiring more non-volatile storage.

More specifically, different basic input/output system (BIOS) functions are split into components, or objects, and selected ones of the components are stored in a compressed state and these compressed components are only decompressed and executed when needed. A decompression dispatcher software takes a request from currently executing BIOS code to decompress another portion of BIOS code that may be needed. The requester can specify whether or not to just decompress the portion of code into memory or to decompress and initialize the decompressed BIOS. The decompression dispatcher can be used to dispatch different portions of BIOS code to different processors in a multi-processor system.

The BIOS stored in a read only memory (ROM) is organized into a set of components, each being dispatched as an independent executable object after being copied to a shadow memory portion of a random access memory (RAM). Three types of components are defined, initialization components, runtime components and functional components. The initialization components are dispatched during a Power On Self Test (POST) cycle such that the initialization components are active during initialization. The initialization components are terminated prior to loading an operating system. The runtime components are maintained in the uncompressed/decompressed state and executable after loading of the operating system. The functional components are decompressed and dispatched on an as needed basis. The components can be actively or passively dispatched. Control over a dispatched object is returned to a requester by the decompression dispatcher upon a condition that the component is to be passively dispatched and the passively dispatched component is recorded in a memory manager. Control over a dispatched object is passed to the decompressed component upon a condition that the component is to be actively dispatched. When dispatching components the decompression dispatcher works from a packing list provided in the ROM image by a BIOS build process. To optimize device usage, the binary images that comprise the different components are packed into the final ROM image. The packing list provides a detailed description of the packing as well as other important pieces of information regarding the types of components that have been packed into the ROM.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

Figure 1:
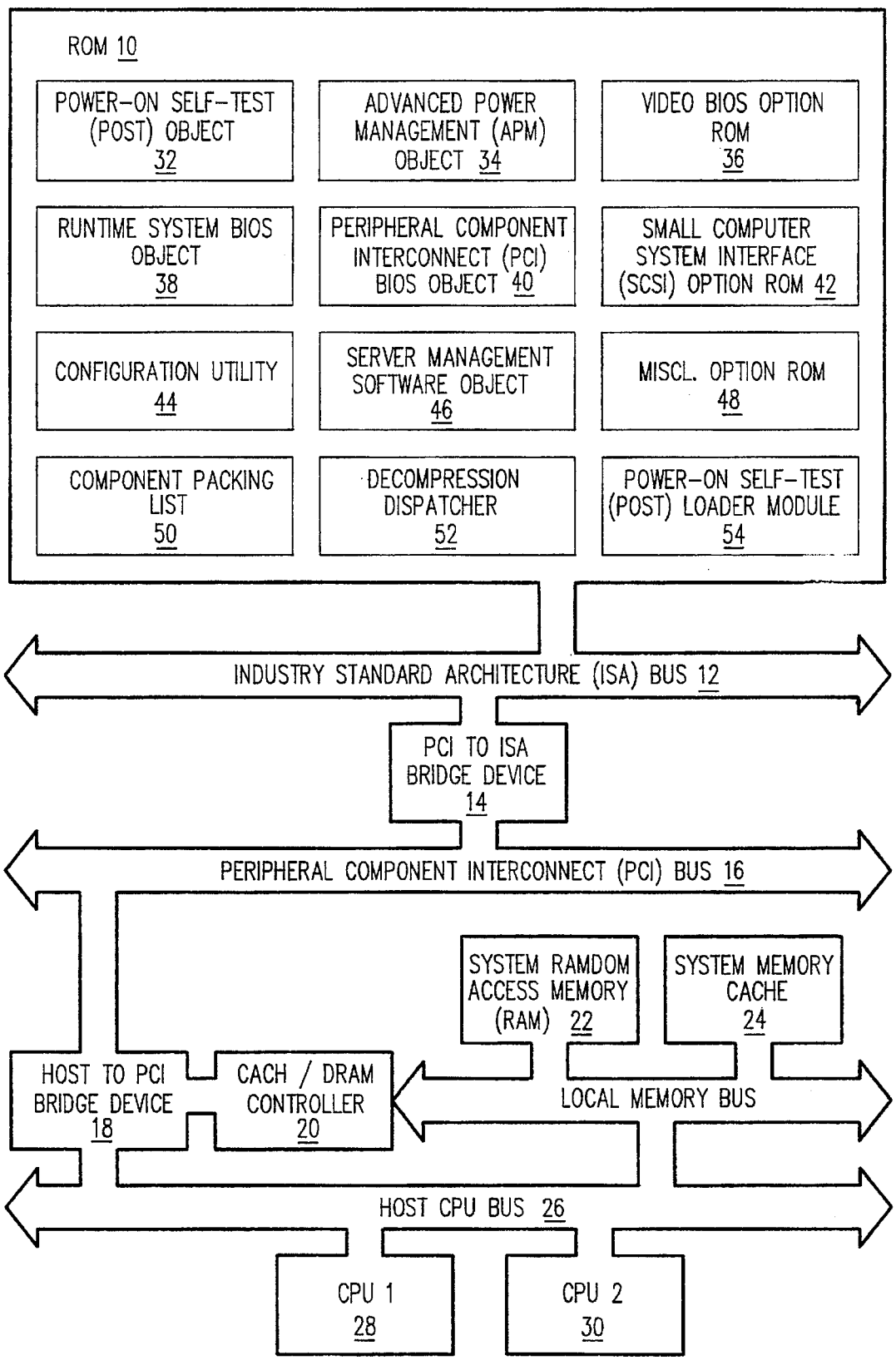
FIG. 1 is a block diagram of a computer system in which the present invention is embodied.

Refer to FIG. 1 which is a block diagram of a computer system in which the present invention is embodied. The computer includes a read only memory, or ROM, (10), a dynamic random access memory, or DRAM, (22), a system memory cache (24), a cache/DRAM controller (20), and central processing units (28, 30). A set of programs called basic input/output system (BIOS) are encoded in ROM (10). The BIOS facilitates the transfer of data and instructions between the central processing units (28, 30) and peripheral devices. In the present invention the BIOS is organized into a set of BIOS components (32 through 54), each of which is capable of being dispatched as an independent executable object. Each BIOS component is a self-contained (link independent) binary image that performs a certain task or function. The BIOS components fall into three major types: initialization components, runtime components and functional components.

The ROM (10) is a non-volatile device used to store the BIOS components, some in a compressed state and some in an uncompressed state. The DRAM (22) stores a shadow RAM binary image of selected components stored in the ROM. For those components stored in the compressed state, they are decompressed before storing in the shadow RAM. In Intel 80386 and 80486 computers, shadow RAM is a portion of upper memory area set aside for programs retrieved from ROM.

Compressed code is the code that resides in the ROM in a compressed state. Decompressed code is code that has been decompressed from its compressed state inside the ROM and now resides in DRAM (22) shadowed memory, in a decompressed state. Uncompressed code is code that resides inside the ROM in an uncompressed state. This is code that was never compressed.

A component that has been decompressed and activated is an object that is manipulated with modular programming techniques.

Stored in the ROM (10) are the following components:power-on self-test (POST) object (32); advanced power management (APM) object (34); video BIOS option ROM (36); runtime system BIOS object (38); peripheral component interconnect (PCI) BIOS object (40); small computer system interface (SCSI) option ROM (42); configuration utility (44); server management software object (46); miscellaneous optional ROM(48); component packing list (50); decompression dispatcher (52); and power-on self-test (POST) loader module (54). The decompression dispatcher (52) includes a decompressor, a dispatcher and a memory manager.

The ROM (10) is connected to PCI to ISA Bridge Device (14) via Industry Standard Architecture (ISA) Bus (12). The PCI to ISA Bridge Device (14) is connected to the Peripheral Component Interconnect (PCI) Bus (16) which is connected to the host to PCI bridge device (18).

System random access memory, RAM, (22) and system memory cache (24) am connected to the Cache/DRAM Controller (20) via a local memory bus. The CPU 1 (28) and the CPU 2 (30) is connected to the host to PCI bridge device (18) via the Host CPU Bus (26).

Figure 13:
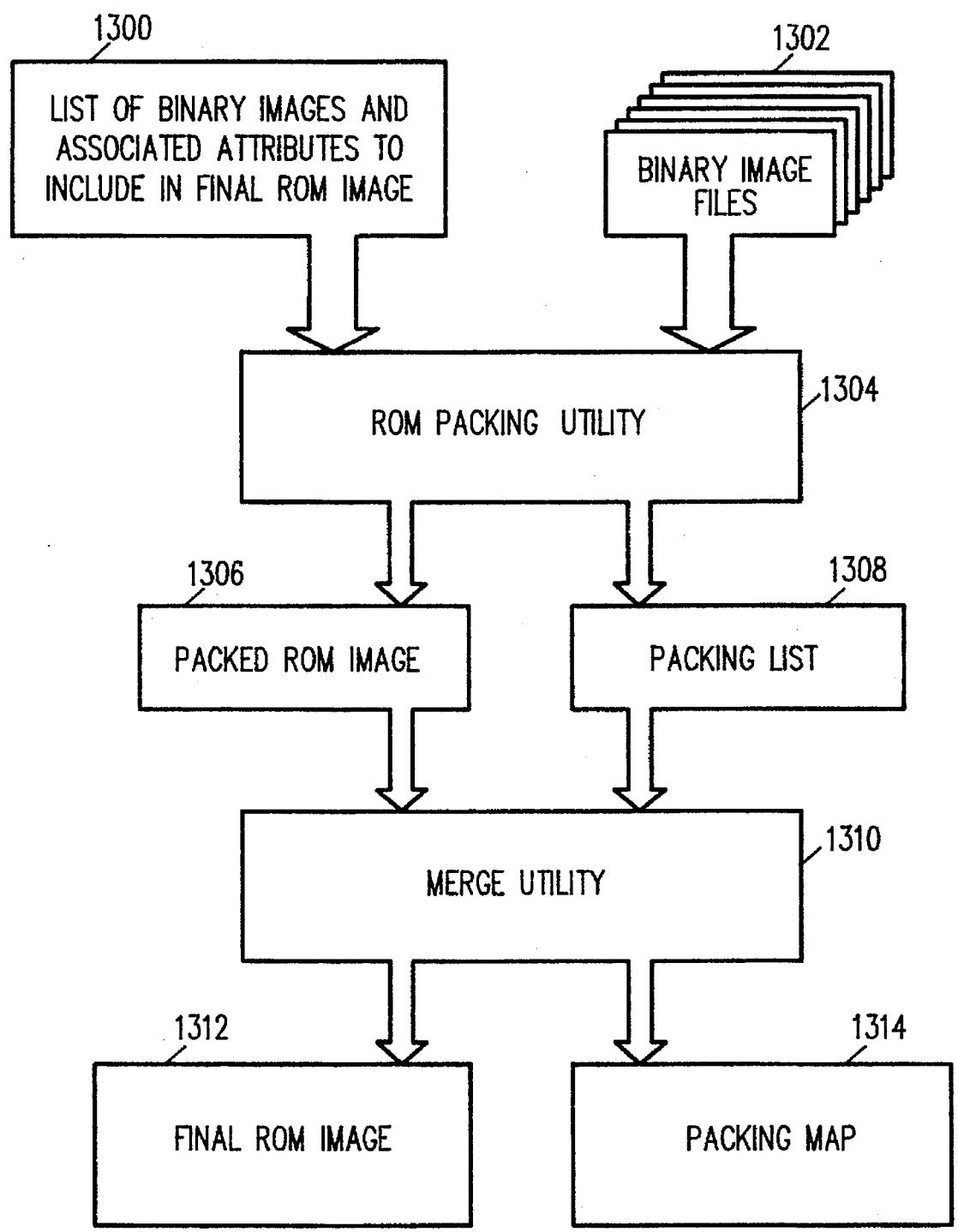

FIG. 13 is a flow diagram of a BIOS build process that automates compressing and packing components into a final ROM binary image. A list of binary images and associated attributes to include in the final ROM image (1300) and a number of binary image files (1302) are provided to a ROM Packing Utility (1304). The ROM Packing Utility (1304) creates a packed ROM image (1306) and a packing list (1308) that are merged by a merge utility (1310) into a final ROM image (1312) and a packing map (1314) that are stored in the ROM (10) shown in FIG. 1.

Terminology

Compressed Code—Compressed code is the code that resides in the BIOS storage device in a compressed state.

Decompressed Code—Decompressed code is code that has been decompressed from its compressed state inside the BIOS storage device and now resides in DRAM or Shadowed Memory in a decompressed state.

Uncompressed Code—Uncompressed code is code that resides inside the BIOS storage device in an uncompressed state, code that never has been compressed.

Storage Device—The non-volatile device used to store the BIOS code (compressed or uncompressed). This may be a FLASH or EEPROM.

Component—A BIOS component is a self-contained (link independent) binary image that performs a certain task or function. A BIOS component could be something as simple as the decompression dispatcher itself or as complex as the entirety of Power On Self Test (POST) software.

Object—An object is an uncompressed/decompressed component that has been activated.

Direct Dependency—A Direct Dependency is a dependency upon another object or component that is satisfied by a far call or absolute jump instruction.

Indirect Dependency—An Indirect Dependency is a dependency upon another object or component that is satisfied by an API such as an interrupt function or the decompression dispatcher.

Packing Utility—The Packing Utility is the utility used by the BIOS build process to automate compressing and packing Components into the final read only memory (ROM) image.

Packing Script—The Packing Script is the script used by the Packing Utility to describe the packing order of the ROM image. The Packing Script facilitates the automated build process.

Packing List—The Packing List is generated by the Packing Utility and describes all the attributes of the packed ROM image. This list is used by the decompression dispatcher to dispatch components.

Decompression dispatcher—The decompression dispatcher is the component responsible for all dispatching activities including decompression.

Component Types

The BIOS is organized into a set of components, each being dispatched as an independent executable object. Components fall into three major types: initialization components, runtime components and functional components.

Initialization components are dispatched during what is commonly referred to as the Power On Self Test (POST) cycle. These components are active during initialization and terminated prior to loading the Operating System. Initialization components may contain direct runtime dependencies but these dependencies are limited to objects of the same Component Class. For the illustrated embodiment, all initialization components are segment relocatable. An example of an initialization component is the POST Object.

Runtime components are objects that are uncompressed or remain decompressed and executable after loading of the Operating System. Typically, runtime components are combined to form the 64K System BIOS image located in the F0000h segment. For the illustrated embodiment, runtime are segment relocatable components do not contain any direct dependencies to any other component regardless of its type or class, but may contain indirect dependencies to other runtime components. An example of a runtime component is the Runtime System BIOS Object.

Functional components are dispatched on an as needed basis. For the illustrated embodiment, a Functional component does not contain any direct dependencies to any other component regardless of type or class. An example of a Functional component is the Configuration Utility.

Component Dispatching

Components are dispatched through a utility called the decompression dispatcher. There are two types of dispatching supported by the decompression dispatcher, active and passive.

Components are said to be passively dispatched when the binary image is decompressed into memory and control is returned to the requester by the decompression dispatcher. Passively dispatched components are recorded in the memory manager or the decompression dispatcher.

All runtime components, actively as well as passively dispatched, are disposed of prior to the boot strap.

Components are said to be actively dispatched when the binary image is decompressed into memory and control is given to the decompressed object.

Components must support Real mode execution to be actively dispatched. Control is given directly to the actively dispatched component by the decompression dispatcher.

Control may or may not be returned to the requester depending upon the Component being dispatched. The code segment (CS), instruction pointer (IP) and Flags of the requester remain on the stack when control is given to a actively dispatched component. That component may execute a ADD SP, 6 if it chooses to maintain control or execute an IRET instruction to return to the requester.

When dispatching components the decompression dispatcher works from a Packing List provided in the ROM image by the BIOS build process. To optimize device usage, the binary images that comprise the different components are packed into the final ROM image. The Packing List provides a detailed description of the packing as well as other important pieces of information regarding the types of components that have been packed into the ROM.

Class Identification

Each Component is identified by its Class and Sub-Class code. The Class/Sub-Class combination must be unique for each component and there must not be two components of the same Sub-Class within a given Class.

Packing Address

The Packing Address field specifies the offset inside the ROM image where the corresponding Component has been located. The Packing Address is typically provided by the Packing Utility unless specified in the Packing Script.

Unitialized Data components will have a Packing Address of zero (00000000h).

Compressed Size

The Compressed Size field specifies the amount of space (in bytes) consumed by a component when it is in the ROM image. Unitialized Data components use this field to specify the maximum amount of memory required and be aligned on a 64K boundary.

Decompressed Size

The Decompressed Size field specifies the amount of space (in bytes) consumed by a decompressed component after it has been dispatched. Components that are placed in the ROM uncompressed have identical Decompressed and Decorepressed sizes.

Unitialized Data components specify this field to be identical to the Compressed Size field.

Load Address

The Load Address field specifies the 32 bit physical address of where the component is to be dispatched. For the illustrated embodiment, this field is specified even if the component is intended to be relocatable. Actively dispatched components specify a Load Address that is below 1 Mb and aligned on a paragraph (16 byte) boundary.

Unitialized Data components specify a load address that is aligned on a 64K boundary. If the Load Address is arbitrary then a value of all FF's (FFFFFFFFh) may be specified. Components referencing Unitialized Data with an arbitrary Load Address use the Get Unitialized Data Address function to determine the actual Load Address of the Unitialized Data. This function can only be called after the Unitialized Data has been dispatched. Refer to the Memory Management section described below for restrictions on fixed Load Address for Unitialized Data components for the illustrated embodiment.

Execution Offset

The Execution Offset field specifies a 16 bit offset into the component where execution is to begin. For the illustrated embodiment, this offset is specified for all components that satisfy direct dependencies of other components regardless of whether or not they are to be actively dispatched. Components that do not satisfy direct dependencies of other components specify this field as FFFFh.

Unitialized Data components specify an Execution Offset of FFFFh.

Relocation Type

The Relocation Type field specifies what type, if any, of component relocation is supported. Types are either: not relocatable; relocatable below 1 MB only; relocatable above 1 MB only; or relocatable anywhere.

Dispatch Type

The Dispatch Type field specifies what type of dispatching is supported by the corresponding component. Types are either:passive dispatching; active dispatching; or both active and passive dispatching.

Component Organization

Though the flexibility of Component Type, Class, and Sub-Class allow unique customization of a particular BIOS, certain components are typically included in every BIOS. These components are:decompression dispatcher, including decompression dispatcher unitialized data, and memory manager POST Loader, power on self test (POST), and system BIOS runtime executable. These components are described in the following paragraphs.

Decompression Dispatcher

The decompression dispatcher component contains all the functions that comprise the decompression dispatcher. Access is gained through an interface defined in the Decompression Dispatcher Functions section described below. This component resides uncompressed in the ROM image.

Decompression Dispatcher Unitialized Data

This component is 128K in length and provides the memory buffers required by the decompression dispatcher.

POST Loader

The POST Loader component handles all hardware generated resets (i.e. power on, front panel, etc.) and software generated resets after being processed by the Shutdown Handler. This component resides uncompressed in the ROM image and may not be dispatched into DRAM. The primary responsibility of this module is to configure enough of the system to gain 2 Mb of DRAM, activate the decompression dispatcher, and cause the main Power On Self Test to be decompressed and dispatched.

Power On Self Test

The Power On Self Test component (32) is the main POST executable, and is responsible for initialization of the system, and causing all necessary components to be dispatched. This component resides in a compressed state in the ROM image, and as described earlier, this component is decompressed and dispatched into DRAM by the decompression dispatcher.

System BIOS Runtime Executable

The System BIOS Runtime Executable component is responsible for all compatible System Services including Interrupt and Device Service Routines. This component contains the Shutdown Handler responsible for handling all software related resets and dispatching the POST Loader as needed. This component resides in a compressed state in the ROM state, and it is decompressed and dispatched into DRAM by the decompression dispatcher.

Decompression Dispatcher Functions

Dispatch Component ( )

The decompression dispatcher component (52) dispatches a Component into memory (22). Each Component is identified by a unique Class/Sub-Class code combination. Dispatched Components are recorded in an Allocation Table kept by the Memory Manager. The actual base address of a Component may be retrieved at any time by calling a Get Physical Address( ) function.

For the illustrated embodiment, it is the responsibility of the caller to ensure that a Enter Flat Mod( ) function has been called and 4 G Data Segments are active (this implies that Gate A20 is enabled) before calling the Enter Flat Mode ( ) Function. Also, if dispatching is being done into shadowed memory (between C0000h-FFFFFh), the caller ensure that the appropriate range has been Read/Write enabled.

Unitialized Data Components are also dispatched using this function. For the illustrated embodiment, all possible requests for Unitialized Data are satisfied in the Packing List at build time in order for them to be dispatched by this function.

Input:

```
AH    00h
AL    00h - Passive Dispatch
      01h - Active Dispatch
BX    Class Code
CX    Sub-Class Code
EDI   Relocation Address (00000000h is Relocation not Requested.)
ESI   Unitialized Data Size (00000000h if Default)
```
Output - Success:
```
CF    Clear (0)
AH    00h
```
Output - Failure:
```
CF    Set (1)
AH    Error Code
      01h - Invalid Function.
      02h - Component Packing List entry not found.
      03h - Component does not support relocation
      04h - Component cannot relocate above 1Mb
      05h - Component does not support Active Dispatching
      06h - Cannot Actively Dispatch above 1Mb
      07h - Active Dispatch aborted because of invalid segment alignment
      08h - Cannot allocate memory for component
      09h - Decompression failed, dispatch aborted.
```

Get Component Attributes( )

This function returns the information from the packing list corresponding to a given component.

Input:
```
AH    01h
BX    Class Code
CX    Sub-Class Code
```
Output - Success:
```
CF    Clear (0)
AH    Relocation Type
AL    Dispatch Type
EDX   Decompressed Size
SI    Execution Offset
EDI   Default Load Address
```
Output - Failure:
```
CF    Set (1)
AH    Error Code
      01h - Invalid Function.
      02h - Component Packing List entry not found.
```

Get Component SubClass( )

Return the Sub-Class code for entry n in the Packing List that corresponds to a given Component Class code. To find all components related to a given Class code call this function repeatedly incrementing the Entry Number until a failure is returned.

Input:
```
AH    02h
AL    Entry Number
BX    Class Code
```
Output - Success:
```
CF    Clear (0)
CX    Sub-Class Code
```
Output - Failure:
```
CF    Set (1)
AH    Error Code
      01h - Invalid Function.
      02h - Component Packing List entry not found.
```

Enter Flat Mode( )

Enter Flat Mode execution. This function is provided for general component usage and places the system in a mode where the full 4 G address range can be accessed through the general segment registers. Gate A20 must be set by the caller prior to using this function. CS and SS are unchanged and have 64K access.

Input:
```
AH    03h
      Gate A20 Must be Enabled.
```
Output - Success:
```
CF    Clear (0)
DS    0000h (4G Access)
ES    0000h (4G Access)
FS    0000h (4G Access)
GS    0000h (4G Access)
```
Output - Failure:
```
CF    Set (1)
AH    01h - Invalid Function.
```

Leave Flat Mode( )

Leave Flat Mode execution. This function turns off the flat mode execution. It is the responsibility of the caller to track and change the state of the Gate A20. No A20 switching is done by this function.

```
Input:

AH    04h
Output - Success:

CF    Clear (0)
    DS    0000h (64K Access)
    ES    0000h (64K Access)
    FS    0000h (64K Access)
    GS    0000h (64K Access)
Output - Failure:

CF    Set (1)
    AH    01h - Invalid Function.
```

Dispose Component( )

This function removes a component from memory based upon the Class and Sub-Class identifier provided by the caller. An error is returned to the caller if the given component does not have an entry in the Allocation Table. Components that have been disposed of by this function are removed from memory and the memory re-initialized to all zero's (0000h)

```
Input:

AH    05h
    BX    Class Code
    CX    Sub-Class Code
Output - Success:

CF    Clear (0)
    AH    00h
```

Get physical Address( )

Return to the caller the base address and size of any dispatched Component identified by the given Class and Sub-Class code. An error is returned to the caller if the given Component does not have an entry in the Allocation Table.

```
Input:

AH    06h
    BX    Class Code
    CX    Sub-Class Code
Output - Success:

CF    Clear (0)
    AH    00h
    EDI   32 bit Base Address of Component
    EDX   Size of Component in bytes (1K aligned)
Output - Failure:

CF    Set (1)
    AH    01h - Invalid Function.
          02h - Component Allocation Table entry not found.
```

Memory Management

The memory manager is responsible for managing memory allocation for the BIOS' memory. Memory testing and subsequent update of status are all done in 'Real Big' mode as opposed to constantly switching between Real and Protected Mode. 'Real Big' mode is a mode where the data segment registers of the processor are loaded with Protected Mode type characteristics while the code and stack segment registers retain their Real Mode characteristics. The processor essentially runs in Real Mode while allowing a full 4 GB access to memory.

Memory Map

| Address | | |
|---|---|---|
| FFFFFFFFh | System FLASH ROM | 4G |
| | Reserved Address Space | 4G-FLASH Size |
| | Reserved Address Space | |
| | Reserved System Memory | Top of Memory |
| 00400000h | Available to decompression dispatcher | 4Mb |
| 00104000h | Reserved for decompression dispatcher | 1M + 16K |
| 00100000h | Reserved for System BIOS and Option ROMs | 1M |
| 000C0000h | Reserved for Video Memory | 768K |
| 000A0000h | Reserved for ISA Network Adaptors | 640K |
| 00080000h | Available to decompression dispatcher | 512K |
| 00010000h | Reserved for DOS Compatibility | 64K |

```
               -continued

Output - Failure:

CF    Set (1)
    AH    01h - Invalid Function.
          02h - Component Allocation Table entry not found.
```

The Memory Manager tracks allocated memory blocks using a 4K byte map and a 6K allocation table. The Memory Manager uses the 4K byte map to specify the allocated blocks of memory. Each byte in the byte map represents a 1K block of memory starting at 0 Mb and ending at 4 Mb. A set byte (FFh) in a byte location means the represented 1K block of memory has already been assigned to a requester. A clear byte (00h) in a byte location means the represented 1K block of memory is available.

The Memory Manger uses the 6K Allocation Table to identify the assignee of each memory block. There is enough room in the Allocation Table to assign 512 blocks of memory to unique Components. Each entry in the Allocation Table has the following format:

| Field | Offset | Length | Description |
|---|---|---|---|
| Class | 0h | WORD | Class code of component using memory. |
| Sub-Class | 2h | WORD | Sub-Class code of component using memory. |
| Base Address | 4h | DWORD | 32 bit Physical address of memory. |
| Size | 8h | DWORD | 32 bit Length of memory block. |

When a request is being made for memory the Memory Manager searches the byte map for a block of memory large enough to satisfy the request. This search is conducted on a first fit algorithm. When a location is found, the corresponding byte is set in the byte map and then logged in the first available entry in the Allocation Table.

Interface Functions
Init Memory Manager( )
Alloc Memory Block( )
Reserve a block of memory for a given Component.

```
Input:
    BX      Class Code
    CX      Sub-Class Code
    EDI     Physical Address (00000000h is not specified.)
    ESI     Size of Block to allocate.
Output - Success:
    CF      Clear (0)
    AH      00h
    EDI     Physical Address of allocated memory block
Output - Failure:
    CF      Set (1)
    AH      07h - Cannot allocate memory for component
```

Dealloc Memory Block( )
Un-Reserve a block of memory for a given Component.

```
Input:
    BX      Class Code
    CX      Sub-Class Code
Output:
    None
```

Get Memory Block( )
Where am I function.

```
Input:
    BX      Class Code
    CX      Sub-Class Code
Output - Success:
    CF      Clear (0)
    AH      00h
    EDI     Physical Base Address
    EDX     Size of Block
```

```
-continued
Output - Failure:
    CF      Set (1)
    AH      07h - Cannot allocate memory for component
```

Description of Flow Charts

Figure 2:
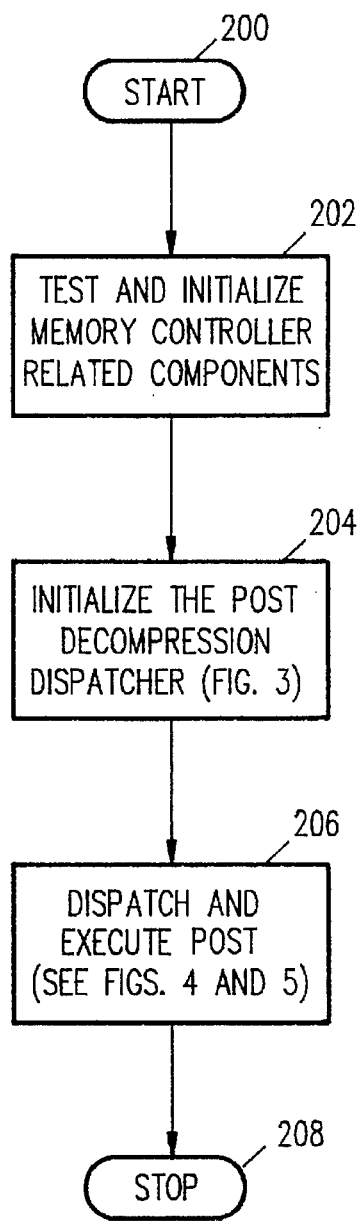
FIG. 2 is a flow diagram of a basic input/output system (BIOS) program in accordance with the present invention.

Refer to FIG. 2 which is a flow diagram of a basic input/output system (BIOS) program in accordance with the present invention. The program starts (200), and tests and initializes the memory controller related components (202). Next the program initializes its decompression dispatcher (204) shown in more detail in the flow diagram of FIG. 3. Finally, the program dispatches and executes its POST component (206) as shown in FIGS. 4 and 5, and stops (208).

Figure 3:
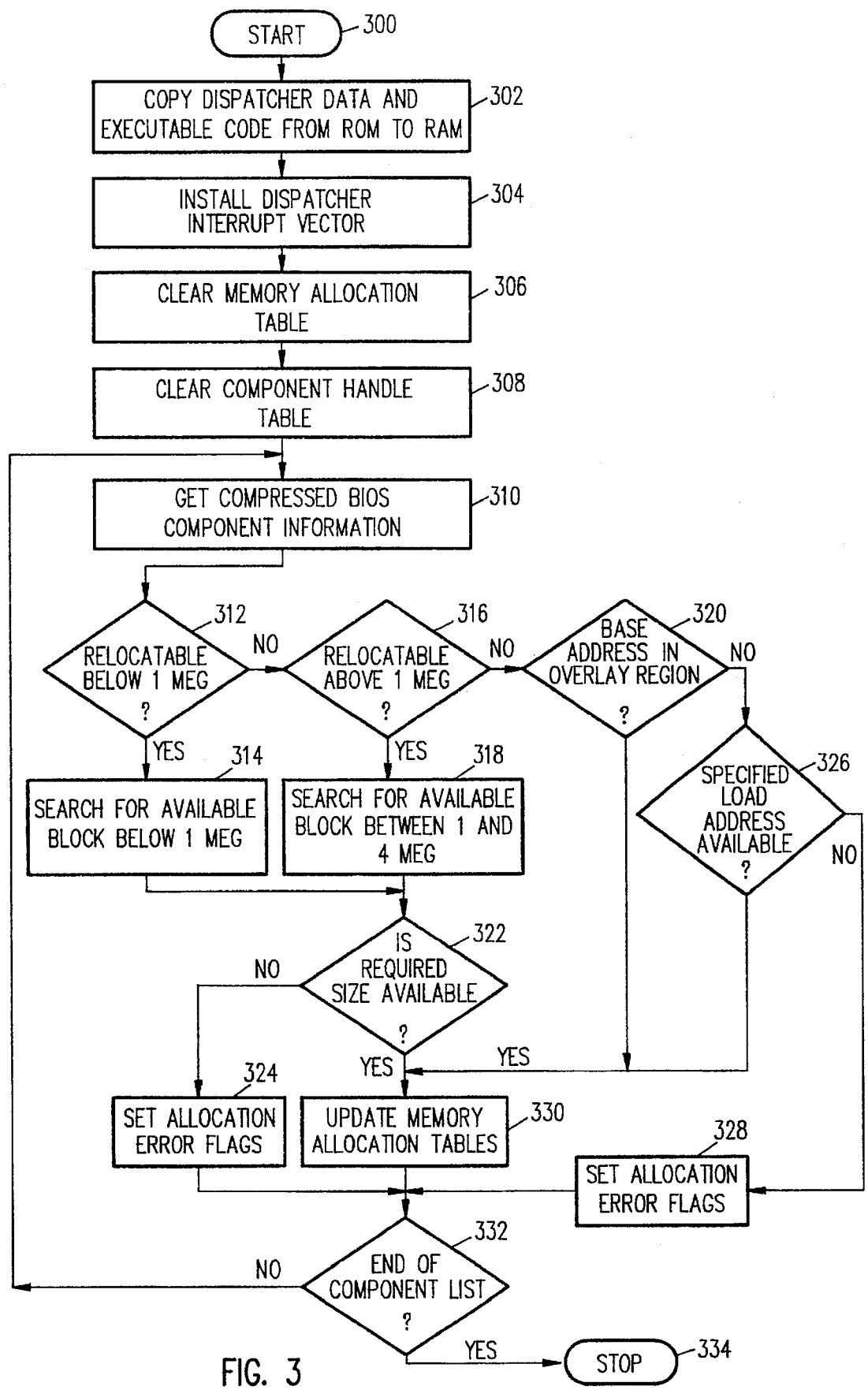
FIG. 3 is a flow diagram of initializing the decompression dispatcher of FIG. 2.

Refer to FIG. 3 which is a flow diagram of initializing the decompression dispatcher of FIG. 2. The dispatcher data and executable code is copied (302) from the ROM to the RAM. The dispatcher interrupt vector is installed (304), the memory allocation table is cleared (306) and the component handle table is cleared (308). The compressed BIOS component information in the packing list is fetched from RAM (310). The relocation type field is examined to find what type of relocation is supported, below 1 meg. (312, 314), above 1 meg. (316, 318), or anywhere (320). If the required size is not available (322) allocation error flags are set (324). If the specified load address is not available (326) allocation error flags are set (328).

If the required size is available (322), then the memory allocation table is updated (330). If the end of the component list in the packing list has not been reached (332), then the flow returns to block (310). If the end of the component list in the packing list has been reached (332), then the flow ends (334).

Figure 4:
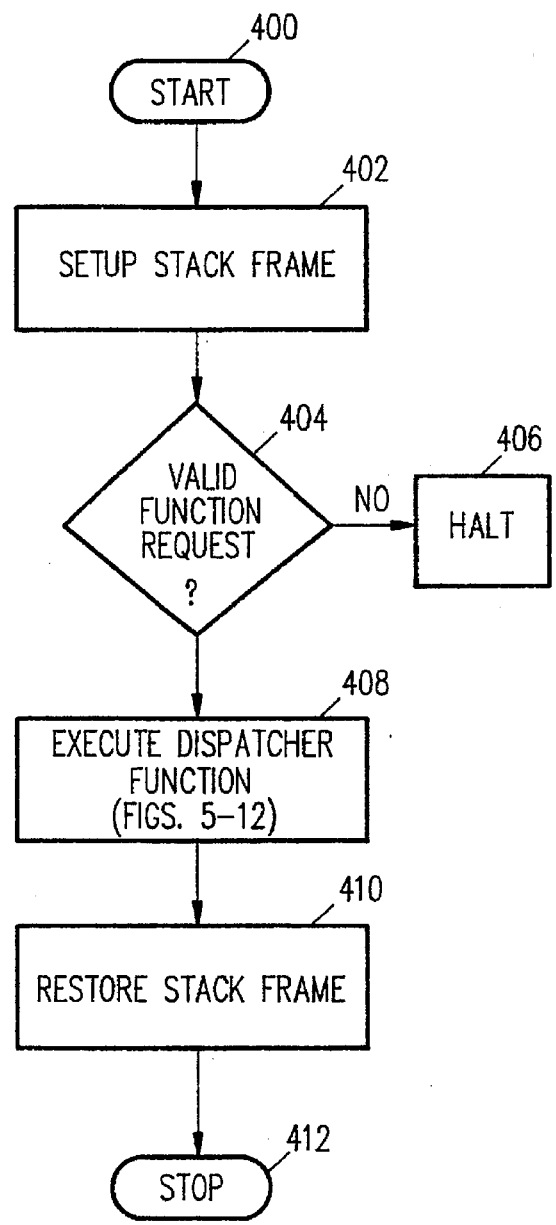
FIG. 4 is a flow diagram of how the decompression dispatcher of FIG. 2 is invoked.
Figure 5:
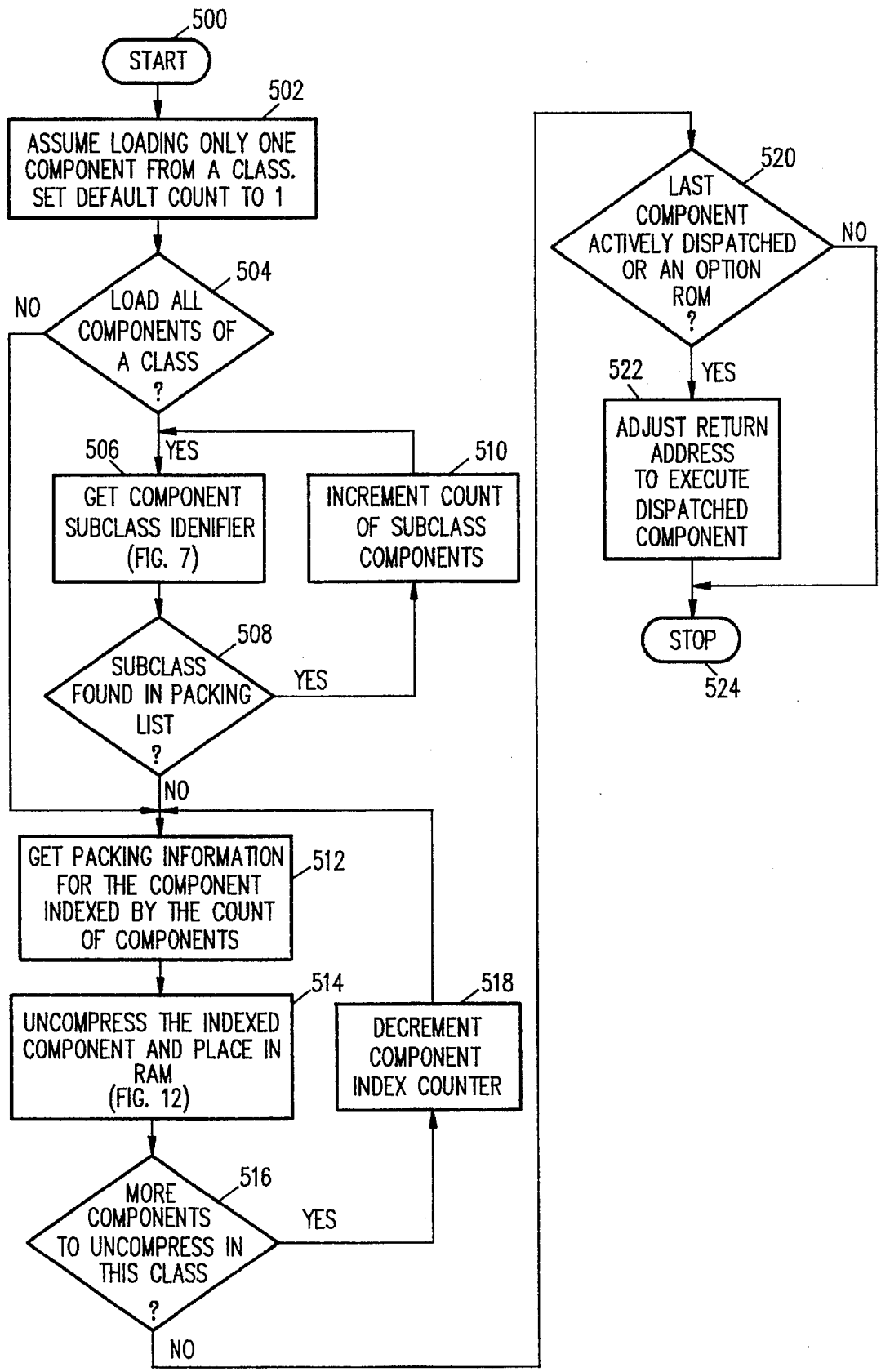
FIG. 5 is a flow diagram of how components are dispatched.

Refer to FIG. 4 which is a flow diagram of how the decompression dispatcher is invoked. The function to be dispatched requires the passing of and returning of parameters through a stack, which is an area of RAM set aside for temporary storage of the parameters. The portion of the stack holding local variables and parameters of a procedure is called a stack frame. The stack frame is set up (402) and a check is made to determine if the requested function is valid (404). If not, the procedure is halted (406). If yes, then the dispatcher function is executed (408). When the flow returns, the stack frame is restored (410) and the flow ends (412). FIGS. 5 through 12 are flows for execution of the dispatcher function block (408) of FIG. 4.

Refer to FIG. 5 which is a flow diagram of how components are dispatched. The dispatcher assumes only one component from a class is being loaded, and hence the count of components is set to 1. The counter is used as an index into the packing list. The component of a class might contain a number of components referenced by a subclass identifier. A check (504) is made to determine if all components of the class are to be loaded. If yes, then the first subclass identifier is fetched (506) as described in FIG. 7. If the subclass is found in the packing list (508) then the count of the subclass index counter is incremented (510). If the subclass is not found in the packing list (508), then the count of the subclass index counter is not incremented and the flow proceeds to get packing information for the component indexed by the count of the component counter (512). The procedure next decompresses the component at the index count and places the decompressed Code in RAM (514). The details of block (514) are shown in more detail in FIG. 12. At the end of the decompressing procedure, a check (516) is made to determine if there are more components in this class to decompressed. If yes, the component index counter is decremented (518). If no, a check (520) is made to determine if this is the last component actively dispatched or if an option ROM is present. If not, the flow ends (524). If yes, then the return address is adjusted to execute the dispatched component (522).

Figure 6:
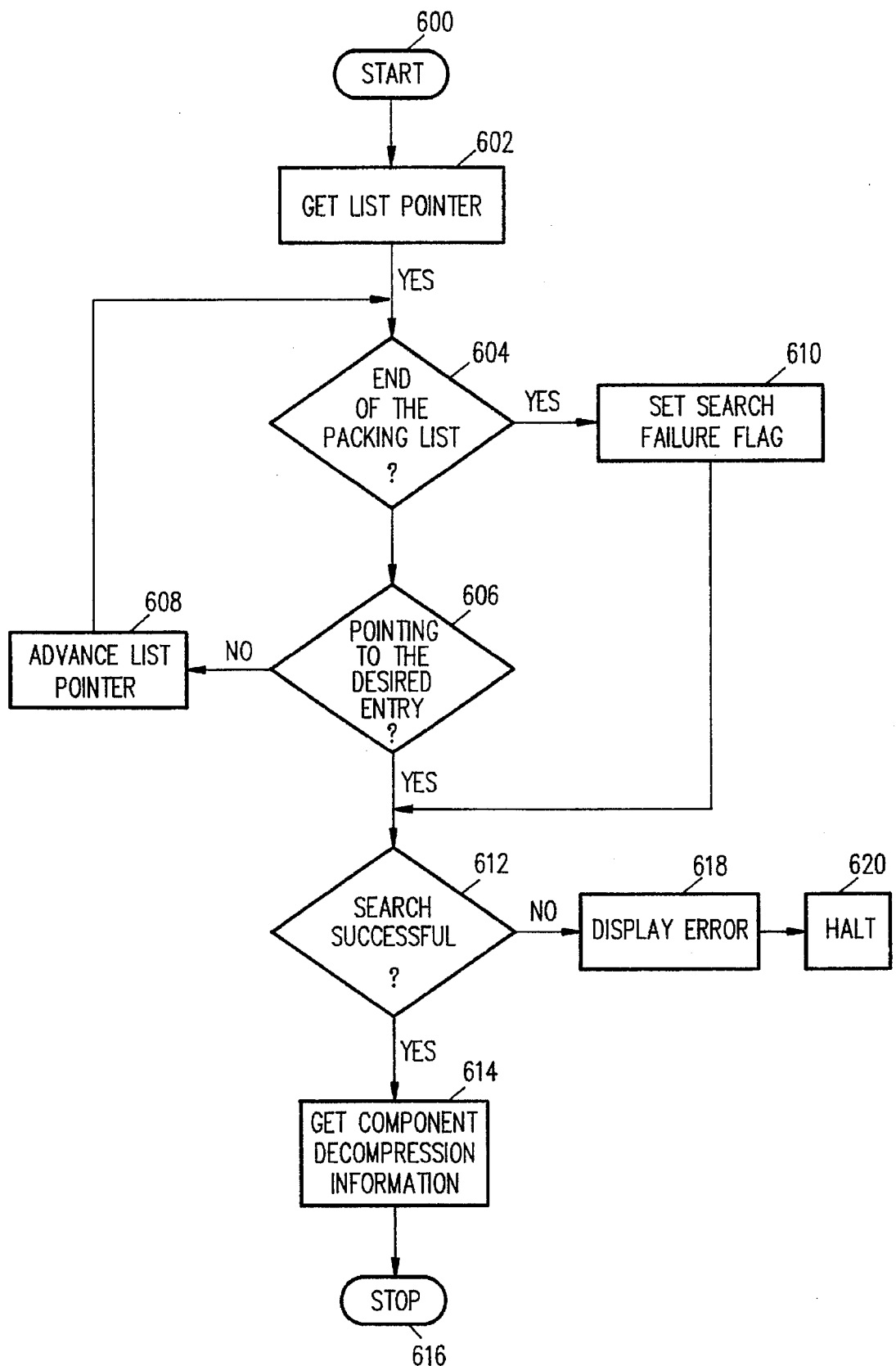
FIG. 6 is a flow chart of the execution of the dispatched component.

Refer to FIG. 6 which is a flow chart of the execution of the dispatched component. The list pointer for the packing list entries is fetched (602). The packing list pointer is checked (604) to determine if the end of the packing list is pointed to. If yes, a search failure flag is set (610). If no, a check (606) is made to determine if the pointer is pointing to the desired entry. If no, the list pointer is advanced (608). If yes, the flow proceeds to block (612). If the search of the packing list is successful (612), then the component decompression information is fetched (614), and this part of the procedure ends (616).). If the search of the packing list is not successful (612), an error is displayed (618) and the procedure is halted (620).

Figure 7:
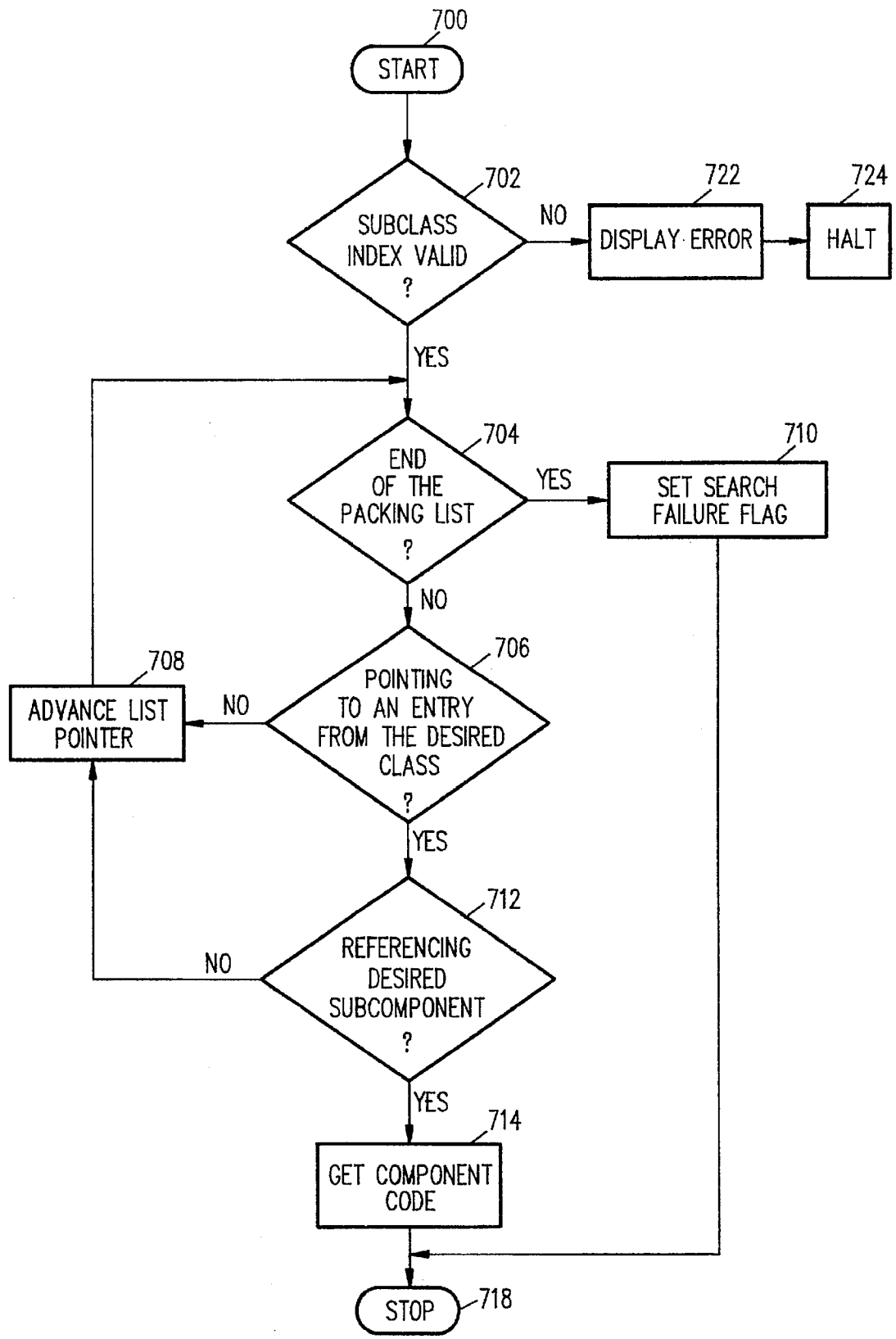
FIG. 7 is a flow diagram of the get component subclass identifier block (506) of FIG. 5.

Refer to FIG. 7 which is a flow diagram of the get component subclass identifier block (506) of FIG. 5. The sub class index is checked (702) to determine if it is valid. If not valid, an error is displayed (722) and the procedure is halted (724). If yes, the packing list pointer is checked (704) to determine if the end of the packing list is pointed to. If yes, a search failure flag is set (710). If no, a check (706) is made to determine if the packing list pointer is pointing to an entry from the desired class. If no, the packing list pointer is advanced (708). If yes, a check (712) is made to determine if the packing list pointer is referencing a desired sub component, if no, the packing list pointer is advanced (708). If yes, the component code is fetched from the ROM (714) and this portion of the procedure stops (718).

Figure 8:
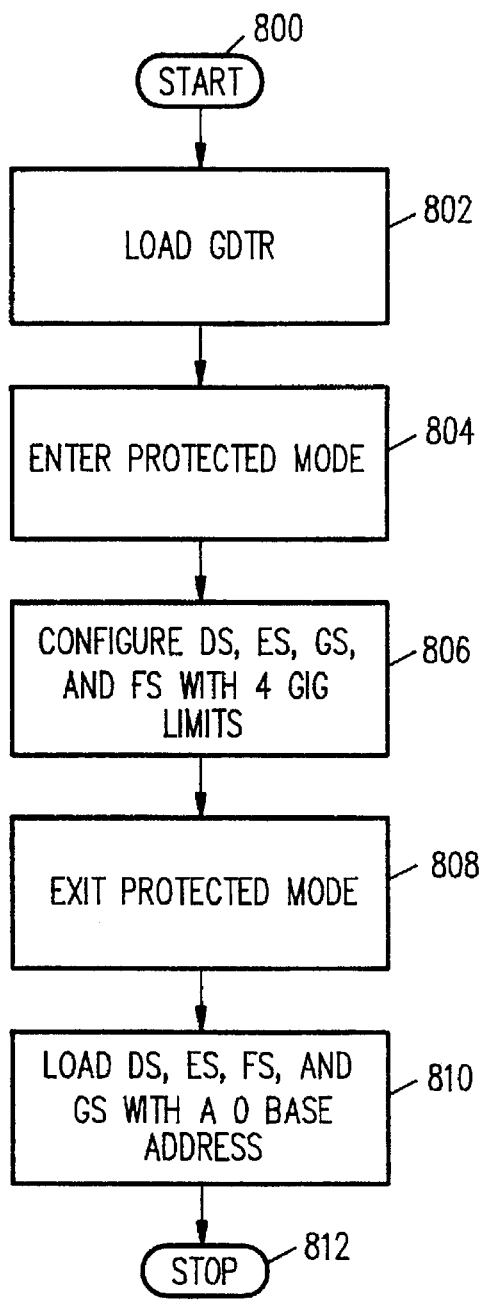
FIG. 8 is a flow diagram of dispatching components of a class that is protected and having a 4 gig limit.

Refer to FIG. 8 which is a flow diagram of dispatching of components of a class that is protected and having a 4 gig limit. The procedure loads the a global descriptor table register (GDTR) (802) with a global descriptor table and then enters protected mode (804). A data segment (DS), an extra segment (ES), a global segment (GS), and a general-purpose file segment (FS) register of the computer system is the 4 gig limit and protected mode is exited (808). The registers DS, ES, FS, and GS are loaded with a 0 base address (810) and the procedure stops (812).

Figure 9:
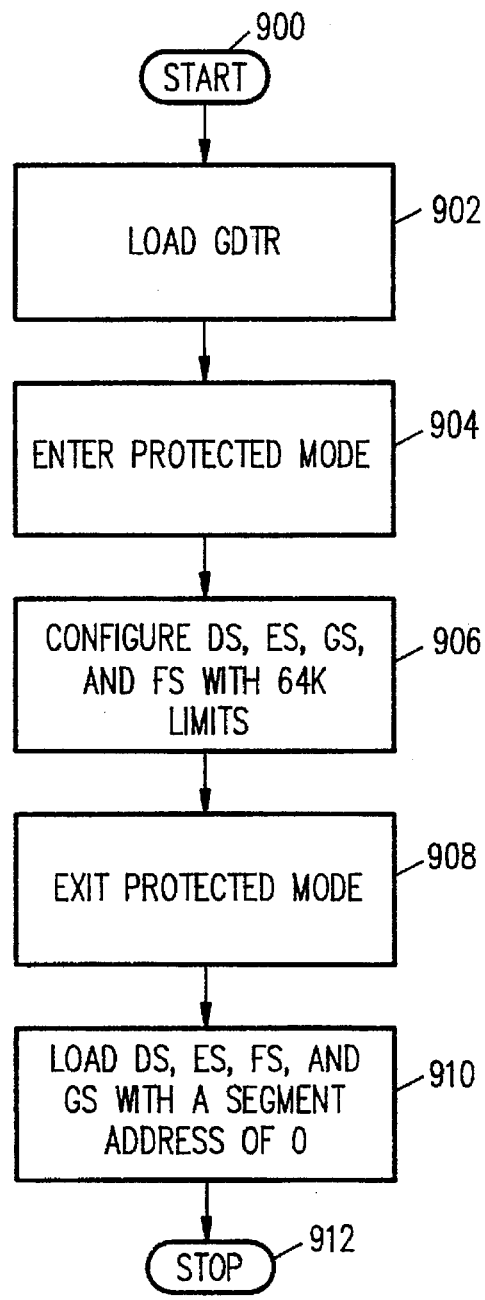
FIG. 9 is a flow diagram of dispatching components of a class that is protected and having a 64K limit.

Refer to FIG. 9 which is a flow diagram of dispatching of components of a class that is protected and having a 64K limit. The procedure loads a global descriptor table register (GDTR) (902) with a global descriptor table and then enters protected mode (904). The data segment (DS), extra segment (ES), global segment (GS), and general-purpose file segment (FS), registers are configured with 64K limits and protected mode is exited (908). The registers DS, ES, FS, and GS are loaded with a 0 base address (910) and the procedure stops (912).

Figure 10:
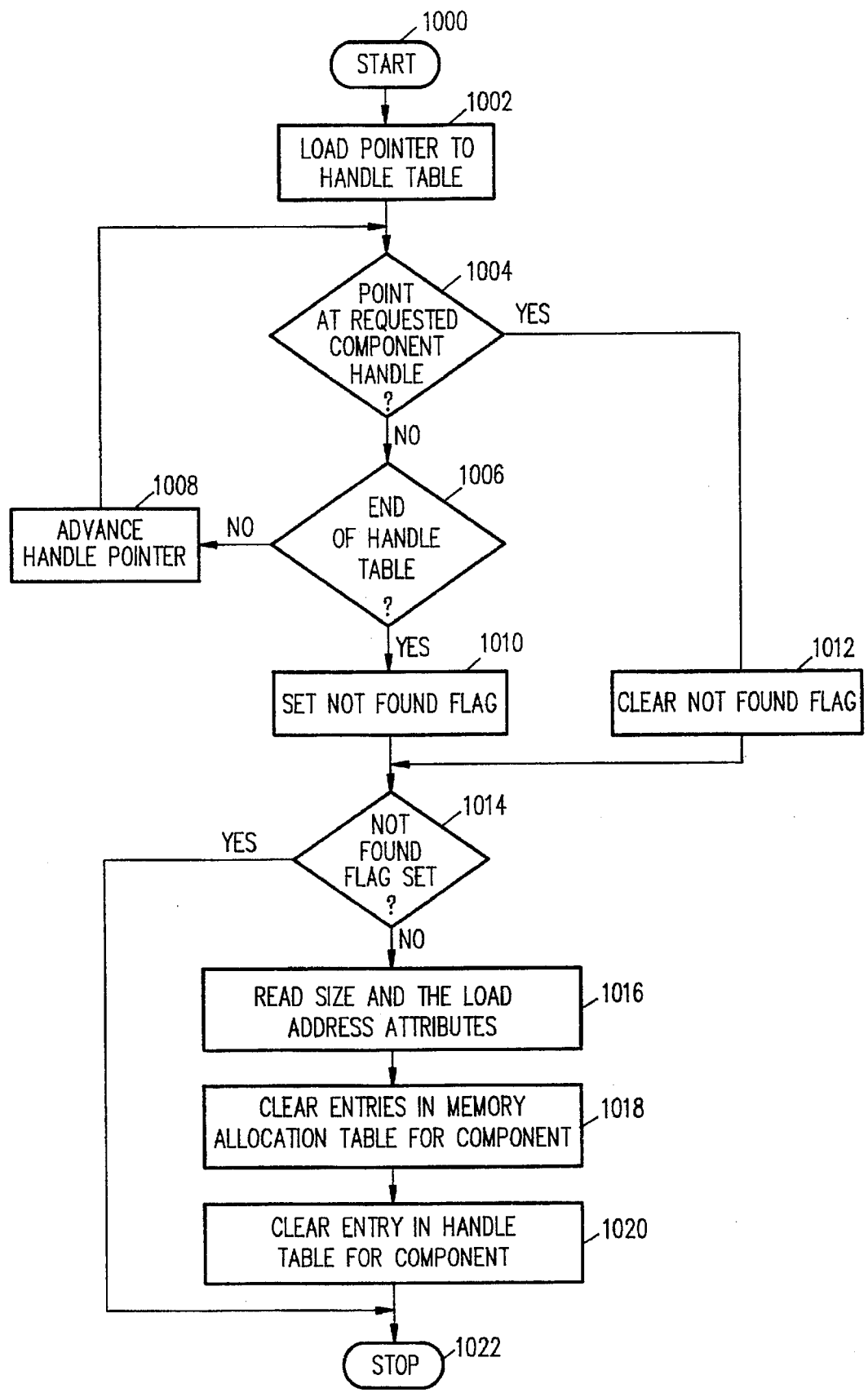
FIG. 10 is a flow diagram of removing a component from memory.

Refer to FIG. 10 which is a flow diagram of removing a component from memory. The procedure loads the pointer to the handle table (1002), and checks to see if it is pointing to the correct entry (1004). If not, it checks to see if it is at the end of the table (1006) and if so sets the not found flag (1010) and flow proceeds to block (1014). If it is not at the end of the table the pointer is incremented to the next entry (1008) and the flow returns to block (1004). If the handle pointer is at the correct entry, the not found flag is cleared (1012) and flow proceeds to block (1014). If the not found flag is set the procedure is exited (1022), otherwise the size and address are retrieved (1018) and the corresponding entry is cleared from the memory allocation table (1018) and the handle entry is cleared from the handle table (1020).

Figure 11:
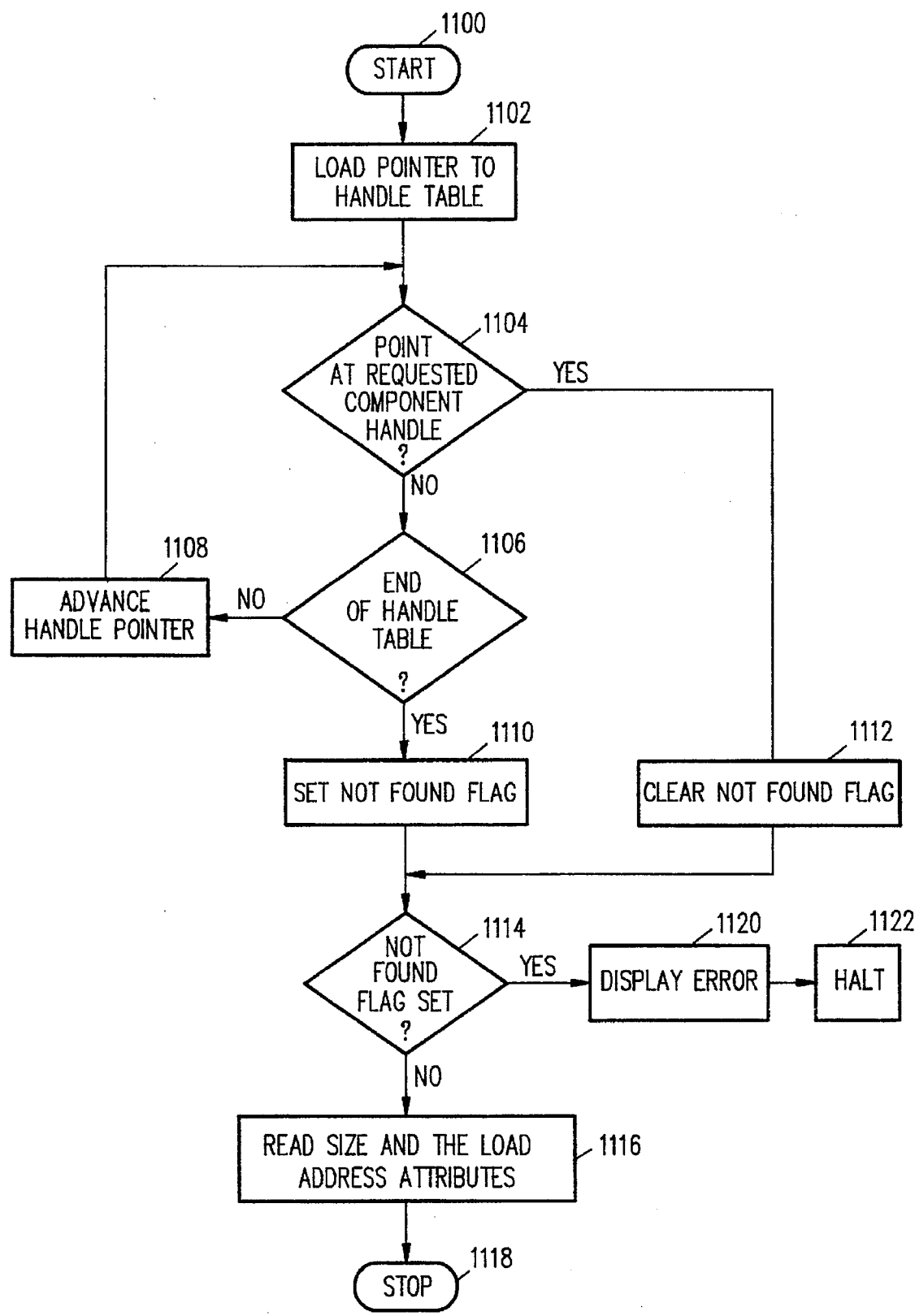
FIG. 11 is a flow diagram of a function returning the size and address of any dispatched component.

Refer to FIG. 11 which is a flow diagram of a function which returns the size and address of any dispatched component. This function loads the pointer to the handle table (1102), and checks to see if it is pointing to the correct entry (1104). If not, it checks to see if it is at the end of the table (1106) and if so sets the not found flag(1110)and flow proceeds to block (1114). If it is not at the end of the table the pointer is incremented to the next entry (1108) and the flow returns to block (1104). If the handle pointer is at the correct entry, the not found flag is cleared(1112)and flow proceeds to block (1114). If the not found flag is set, an error is displayed (1120) and the function is halted (1122), otherwise the size and address are retrieved (1116) and the function is exited (1118).

Figure 12:
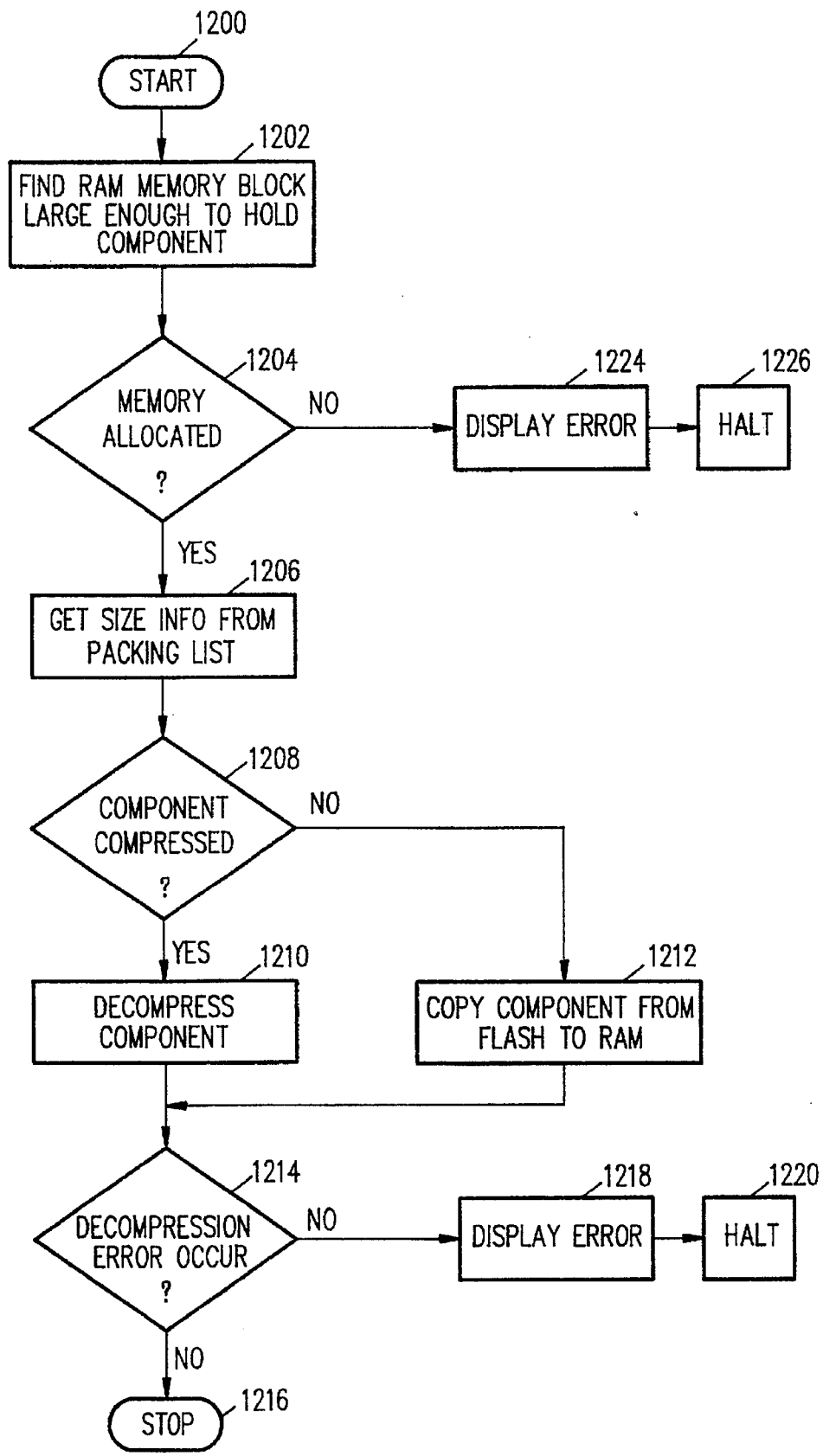
FIG. 12 is a flow diagram of the procedure for getting a specified component transferred and stored in RAM in an uncompressed and executable state; and, FIG. 13 is a flow diagram of a BIOS build process that automates compressing and packing components into a final ROM binary image.

Refer to FIG. 12 which is a flow diagram of the procedure for getting a specified component transferred and stored in RAM in an uncompressed and executable state.

A RAM memory block large enough to hold the specified component is found (1202) and allocated. After the memory space is allocated (1204), the size field in the packing list is accessed to get the size information (1206). The compressed and decompressed size information is obtained from the packing list entry (1206). The Compressed Size field specifies the amount of space (in bytes) consumed by a component when it is in the ROM image. Unitialized Data components use this field to specify the maximum amount of memory required and that they be aligned on a 64K boundary. The Decompressed Size field specifies the amount of space (in bytes) consumed by a component after it has been decompressed and dispatched. As described earlier, components that are placed in the ROM uncompressed have identical Compressed and Decompressed sizes. Unitialized Data components specify this field to be identical to the Compressed Size field.

If the component is not compressed, then the component is copied (1212) to RAM from the non-volatile storage device used to store the compressed or uncompressed BIOS code. If the component is compressed, then the component is decompressed (1210), stored in an uncompressed state in the shadowed memory portion of RAM, and the procedure stops (1216).

In the event that memory cannot be allocated (1204) an error is displayed (1224) and the procedure halts (1226).

While the invention has been particularly shown and described with reference to preferred embodiments thereof, it will be understood by those skilled in the art that the foregoing and other changes in form and detail may be made therein without departing from the scope of the invention.

What is claimed is:

1. An apparatus comprising:
   a) a non-volatile storage having a basic input/output system (BIOS) stored therein, the BIOS being constituted of a plurality of independently executable service components and a decompression dispatcher, the service components being stored in a compressed state, and the decompression dispatcher being used during operation of a computer system within which the apparatus is integrated, to decompress and dispatch the service components for execution, on an as needed basis, to provide basic input/output services to the computer system, and to remove the dispatched service components upon execution when the dispatched service components are no longer needed.

2. The apparatus as set forth in claim 1, wherein the decompression dispatcher includes a first function invocable during operation of the computer system by a first executing one of the service components to cause a first non-executing one of the service components to be decompressed and dispatched for execution.

3. The apparatus as set forth in claim 2 wherein the first executing one of the service components identifies the first non-executing one of the service components to be decompressed and dispatched for execution to the first function of the decompression dispatcher using a first unique component classification code.

4. The apparatus as set forth in claim 2, wherein the first function is equipped to dispatch a non-executing one of the service components in an active or a passive manner, the non-executing one of the service components being given execution control when dispatched in the active manner, and not given control when dispatched in the passive manner.

5. The apparatus as set forth in claim 2, wherein the decompression dispatcher further includes a second function invocable during operation of the computer system by a second executing one of the service components to remove a third executing one of the service components from execution.

6. The apparatus as set forth in claim 1, wherein the decompression dispatcher includes a function invocable during operation of the computer system by an executing one of the service components to obtain information about another service component.

7. The apparatus as set forth in claim 6, wherein the BIOS is further constituted of a component packing list wherein the information about the service components are stored.

8. The apparatus as set forth in claim 7, wherein the information about a service component includes classification information, a compressed size and a decompressed size of the service component.

9. The apparatus as set forth in claim 1, wherein the decompression dispatcher includes a function invocable during operation of the computer system by an executing one of the service components to change the computer system from a first manner of memory management to a second manner of memory management.

10. The apparatus as set forth in claim 1, wherein the BIOS is further constituted of a power-on self-test (POST) loader for servicing reset of the computer system, including configuring a predetermined minimum amount of memory of the computer system for the decompression dispatcher, and loading the decompression dispatcher into the configured memory for execution, both the POST loader as well as the decompression dispatcher being stored in the non-volatile storage in an uncompressed state.

11. The apparatus as set forth in claim 10, wherein the service components include a POST object for performing power-on self-test during an initialization period of the computer system.

12. A computer system comprising:
   a) random access memory (RAM); and
   b) a non-volatile storage having a basic input/output system (BIOS) stored therein, the BIOS being constituted of a plurality of independently executable service components and a decompression dispatcher, the service components being stored in a compressed state, and the decompression dispatcher being loaded into the RAM and used during operation to decompress and dispatch the service components into the RAM for execution, on an as needed basis, to provide basic input/output services to the computer system, and to remove the dispatched service components from the RAM upon execution, when the dispatched service components are no longer needed.

13. The computer system as set forth in claim 12, wherein the decompression dispatcher includes a first function invocable during operation by a first executing one of the service components in the RAM to cause a first non-executing one of the service components to be decompressed and dispatched into the RAM for execution.

14. The computer system as set forth in claim 13, wherein the first executing one of the service components in the RAM identifies the first non-executing one of the service components to be decompressed and dispatched into the RAM for execution to the first function of the decompression dispatcher using a first unique component classification code.

15. The computer system as set forth in claim 13, wherein the first function is equipped to dispatch a non-executing one of the service components into the RAM for execution in an active or a passive manner, the non-executing one of the service components being given execution control when dispatched in the active manner, and not given control when dispatched in the passive manner.

16. The computer system as set forth in claim 13, wherein the decompression dispatcher further includes a second function invocable during operation by a second executing one of the service components in the RAM to remove a third executing one of the service components from execution in the RAM.

17. The computer system as set forth in claim 12, wherein the decompression dispatcher includes a function invocable during operation by an executing one of the service components in the RAM to obtain information about another service component.

18. The computer system as set forth in claim 17, wherein the BIOS is further constituted of a component packing list wherein the information about the service components are stored.

19. The computer system as set forth in claim 18, wherein the information about a service component includes component classification, a compressed size and a decorepressed size of the service component.

20. The computer system as set forth in claim 12, wherein the decompression dispatcher includes a function invocable during operation by an executing one of the service components in the RAM to change the computer system from a first manner of memory management to a second manner of memory management.

21. The computer system as set forth in claim 12, wherein the BIOS is further constituted of a power-on self-test (POST) loader for servicing reset of the computer system, including configuring a predetermined minimum amount of the RAM for the decompression dispatcher, and loading the decompression dispatcher into the configured RAM for execution, both the POST loader as well as the decompression dispatcher being stored in the non-volatile storage in an uncompressed state.

22. The computer system as set forth in claim 21, wherein the service components include a POST component for performing power-on self-test during an initialization period of the computer system.

23. In a computer system, a computer implemented method for providing basic input/output service to the computer system during operation, the computer implemented method comprising the steps of:
   a) loading a decompression dispatcher of a basic input/output system (BIOS) from a non-volatile storage of the computer system into random access memory (RAM) of the computer system for execution, the BIOS including the decompression dispatcher and a plurality of independently executable service components being pre-stored in the non-volatile storage, the decompression dispatcher being pre-stored in an uncompressed state, whereas the service components were pre-stored in a compressed state;

b) the decompression dispatcher decompressing and dispatching, on an as needed basis, needed ones of the service components from the non-volatile storage into the RAM for execution; and c) the decompression dispatcher removing the dispatched service components from the RAM when the dispatched service components are no longer needed.

24. The computer implemented method as set forth in claim 23, wherein step (b) includes the steps of:

(b.1) a first executing one of the service components invoking a first function of the decompression dispatcher and identifying a first non-executing one of the service components to the first function; and (b.2) the first function decompressing and dispatching the first non-executing one of the service components from the non-volatile storage to the RAM for execution.

25. The computer implemented method as set forth in claim 24, wherein in step (b.1) the first executing one of the service components identifies the first non-executing ones of the service components using a unique service component classification code.

26. The computer implemented method as set forth in claim 24, wherein in step (b.2) the first function decompresses and dispatches the first non-executing one of the service components in either an active or a passive manner, the first non-executing one of the service component being given control when dispatched in the active manner, and not given control when dispatched in the passive manner.

27. The computer implemented method as set forth in claim 24, wherein step (b) further includes the steps of:

(b.3) a second executing one of the service components invoking a second function of the decompression dispatcher, and identifying a third executing one of the service components to the second function, and (b.4) the second function removing the third executing one of the service component from the RAM.

28. The computer implemented method as set forth in claim 23, wherein step (b) includes the steps of:

(b.1) a first executing one of the service components invoking a function of the decompression dispatcher, and identifying another service component to the function, and (b.2) the function returning information about the other service component to the first executing one of the service components.

29. The computer implemented method as set forth in claim 28, wherein step (b.2) includes the function retrieving the returned information from a packing list of the BIOS, wherein the returned information are stored.

30. The computer implemented method as set forth in claim 29, wherein the retrieval in step (b.2) includes retrieving a classification, a compressed size, and a decompressed size of the other service component.

31. The computer implemented method as set forth in claim 24, wherein step (b) includes the steps of:

(b.1) a first executing one of the service components invoking a function of the decompression dispatcher, and identifying a first manner of memory management to the function, and (b.2) the function switching the computer system to the first manner of memory management.

32. The computer implemented method as set forth in claim 23, wherein step (a) including the steps of:

(a.1) executing a power-on self-test (POST) loader module upon reset of the computer system, the POST loader module being pre-stored in a decompressed state in the non-volatile storage; and (a.2) the POST loader module loading the decompression dispatcher from the non-volatile storage into the RAM for execution.

33. The computer implemented method as set forth in claim 31, wherein step (b) includes decompressing and dispatching, by the decompression dispatcher, a POST component for performing power-on self-test during an initialization period of the computer system.

* * * * *